(12) United States Patent
Sun et al.

(10) Patent No.: US 6,663,007 B1
(45) Date of Patent: Dec. 16, 2003

(54) COMMON SOCKET DEVICE FOR MEMORY CARDS

(75) Inventors: Chun-I Sun, Taipei Hsien (TW); Wen-Ching Tseng, Taipei Hsien (TW)

(73) Assignee: Kimpo Electronics, Inc., Taipei (TW)

( * ) Notice: Subject to any disclaimer, the term of this patent is extended or adjusted under 35 U.S.C. 154(b) by 0 days.

(21) Appl. No.: 09/709,452

(22) Filed: Nov. 13, 2000

(30) Foreign Application Priority Data

Nov. 15, 1999 (TW) ...................................... 88219373 U

(51) Int. Cl.[7] ............................................... G06K 19/00
(52) U.S. Cl. ........................ 235/487; 235/441; 361/737
(58) Field of Search ................................. 235/485, 490, 235/492, 451, 453, 441; 361/736, 739

(56) References Cited

U.S. PATENT DOCUMENTS

| | | | | |
|---|---|---|---|---|
| 4,532,419 A | * | 7/1985 | Takeda | 235/492 |
| 4,849,615 A | * | 7/1989 | Mollet | 235/380 |
| 4,910,582 A | * | 3/1990 | Miyamoto et al. | 235/492 |
| 4,980,856 A | * | 12/1990 | Ueno | 361/393 |
| 5,370,544 A | * | 12/1994 | Reichardt et al. | 235/441 |
| 5,887,145 A | * | 3/1999 | Harari et al. | 395/282 |
| 5,905,253 A | * | 5/1999 | Ito et al. | 235/486 |
| 5,969,329 A | * | 10/1999 | Vallat | 235/441 |
| 6,002,605 A | * | 12/1999 | Iwasaki et al. | 235/380 |
| 6,293,464 B1 | * | 9/2001 | Smalley, Jr. | 235/451 |

\* cited by examiner

Primary Examiner—Daniel St. Cyr
(74) Attorney, Agent, or Firm—Troxell Law Office PLLC

(57) ABSTRACT

A common socket device for memory cards is a common inserted base with an upper cover to offer a common space for receive a smart media card, a multimedia card, and a secure digital memory card. The common base may be inserted by two or three memory cards without a need of providing two or three kinds of different socket device. Therefore, contact points in the common socket device is reduced substantially, a less volume of the common socket device is obtained comparing to the gross volume of two or three conventional socket devices, and it enhance the convenience for the user.

15 Claims, 16 Drawing Sheets

COMMON SOCKET DEVICE FOR MEMORY CARDS

BACKGROUND OF THE INVENTION

1. Field of the Invention

The present invention relates to a common socket device for memory cards, and particularly to a socket device, which is possible for being inserted by a smart media card, a multimedia card, and a secure digital memory card respectively.

2. Description of Related Art

Usually, a portable personal apparatus such as a digital camera, or a notebook computer is provided with a memory card for storing data. It is necessary to arrange a socket device to receive the memory card of the portable personal apparatus. The socket device has connecting pins therein to contact with the memory card and a microprocessor in the portable personal apparatus. Although a smart media card, a multimedia card, and a secure digital memory card basically are all memory cards, shapes of these cards and numbers of contact points on these cards are different from one another. Hence, socket devices adaptable for different types of memory cards are different from one another in their shapes and connecting pins in number therein either. It means a specific type of socket device can only for a kind of memory card not for all kinds of memory cards. However, it is inconvenient that two or three different socket devices have to be offered in case of two or three different memory cards being used. In this way, a lot of contact points in circuits used in all utilized socket devices are needed and a large gross volume of all utilized socket devices is required either.

SUMMARY OF THE INVENTION

An object of the present invention is to provide a common socket device for memory cards, which is adaptable for different types of memory cards to enhance the convenience while in use.

Another object of the present invention is to provide a common socket device for memory cards, which is less in contact points therein and is smaller in volume than the conventional ones having the same function.

BRIEF DESCRIPTION OF THE DRAWINGS

The present invention can be more fully understood by referring to the following description and accompanying drawing, in which.

DETAILED DESCRIPTION OF THE PREFERRED EMBODIMENT

Figure 1:
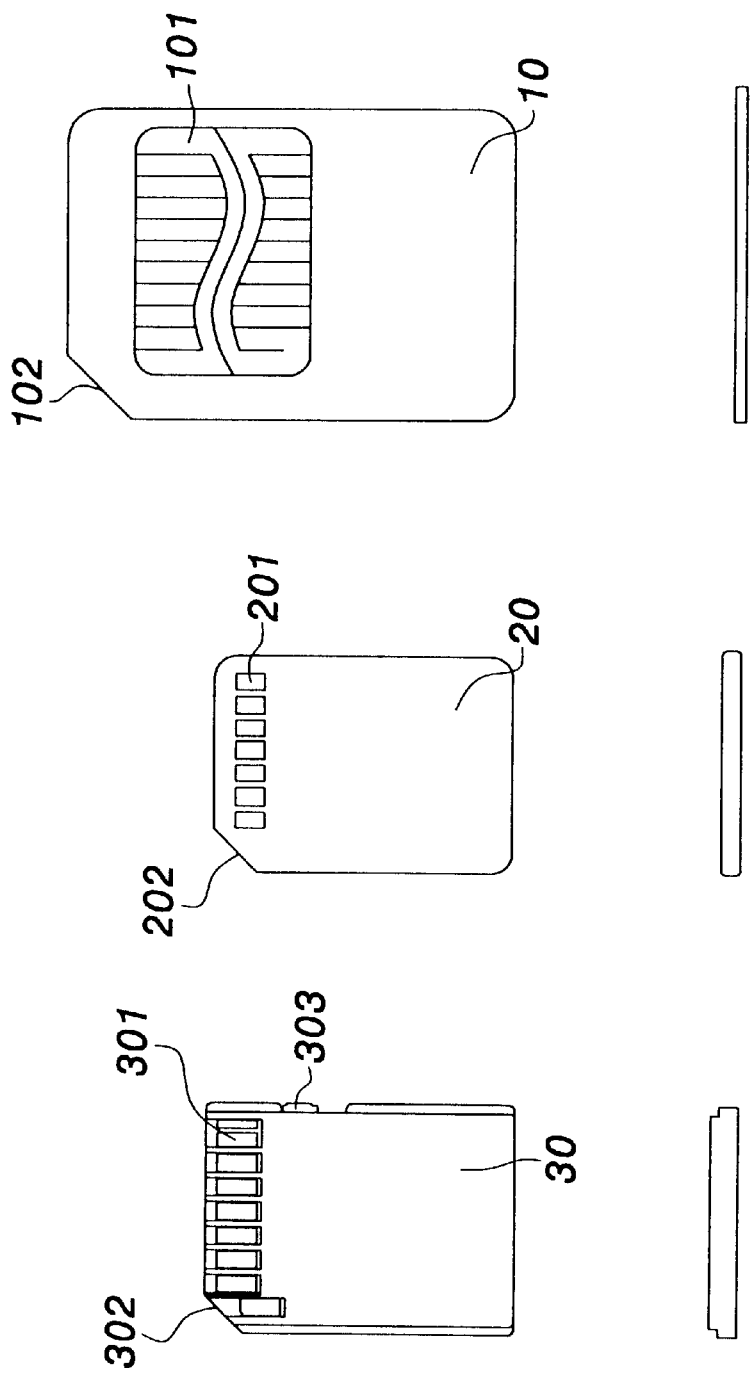
FIGS. 1A, 1B, and 1C are plan views of smart media card, Multimedia card, and security digital memory card illustrating outer looks thereof with thickness.

Referring to FIGS. 1A, 1B, and 1C, the smart media card 10 is bigger and thinner, the multimedia card 20 is smaller and thicker, and the security digital memory card 30 is the same size as the multimedia card 20 but thicker. These three memory cards are attached with exposed contact pieces 101, 201, and 301 on a facial side thereof respectively and contact pieces 101, 201, and 301 are different in number. These contact pieces are ports for memories in these memory cards to connect with outward. The width of each contact piece 101 and the clearance between any two neighboring contact pieces 101 on the smart media card 10 are about the same as that of each contact piece 201 and that between any two adjacent contact pieces 201 on the multimedia card 20 respectively. The clearance between adjacent contact pieces 301 on the security digital memory card 30 is the same as that between adjacent contact pieces 201 on the multimedia card 20. A respective chamfer 102, 202, 302 is provided on these three memory cards, and the security digital memory card 30 is arranged a write protection switch 303 additionally.

Figure 2:
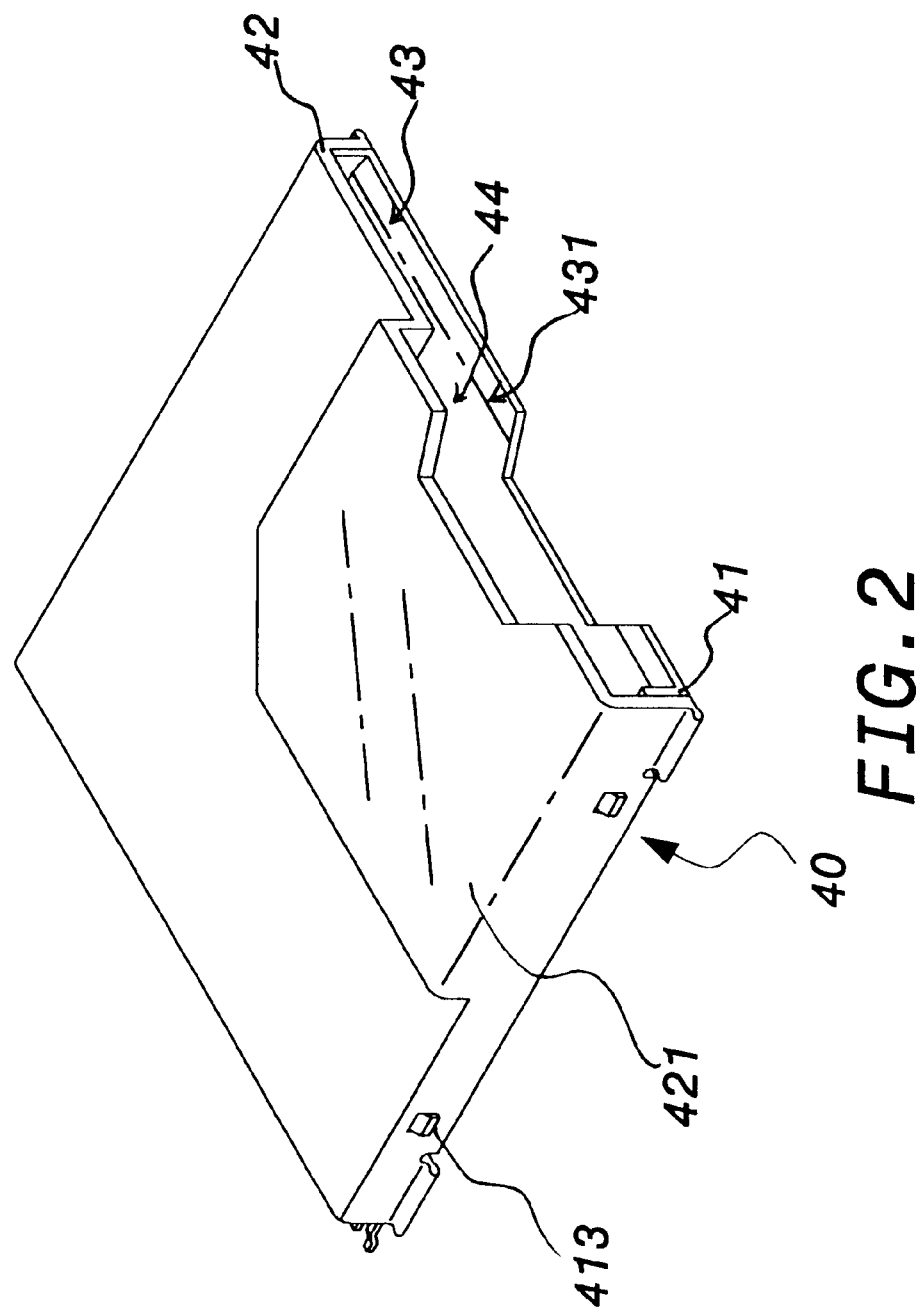
FIG. 2 is a perspective view of common socket device for memory cards according to the present invention in a first embodiment thereof.
Figure 3:
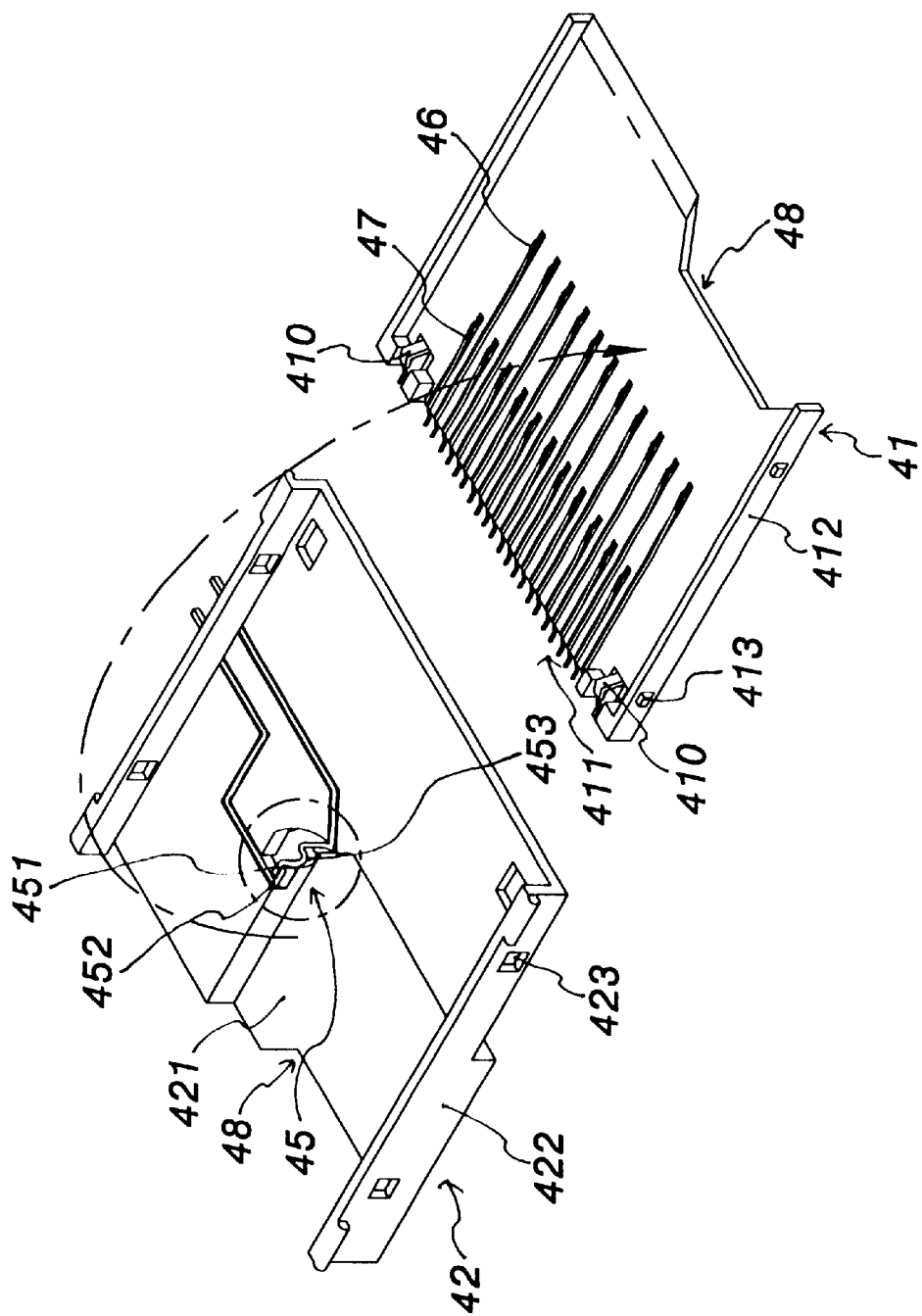
FIG. 3 is a disassembled perspective view of the common socket device for memory cards shown in FIGS. 1A, 1B, and 1C illustrating a base and a cover thereof.

Referring to FIGS. 2 and 3, a first embodiment of the present invention provides a common socket device 40, which comprises a base 41, and an upper cover 42. The common socket device 40 at the interior thereof is arranged a first receiving slot 43, which is wider and thinner for locating the security digital memory card, a second receiving slot 44, which is narrower and thicker for locating the multimedia card. A common section 431 is disposed between the first receiving slot 43 and the second receiving slot 44. The base 41 at both lateral sides thereof has a sensor switch 410 respectively, and long connecting pins 46 and short connecting pins 47 are arranged to have an equal space apart one another alternately between these two sensor switches 410. Each long connecting pin 46 and each short connecting pin 47 at an end thereof extend outward from a rear side 411 of the base 41 for connecting with a circuit on a circuit board. Each long connecting pin 46 and each short connecting pin 47 are elastically bent upward respectively to pressingly contact with two rows of the contact pieces 101 on the smart media card. When the smart media card is inserted into the common socket device 40, a corner opposite to the corner with chamfer 102 on the smart media card presses against one of sensor switches 410. The base 41 at both lateral sides 412 thereof is provided with a projecting piece 413 and at the front end thereof has a recession opening 48 for an inserted memory card being taken out easily. The upper cover 42 has a projection section 421 with a shape corresponding to the multimedia card and a sensor switch 45 is provided at a lateral side thereof to detect if the multimedia card is in the socket device 40 or not. The front end of the upper cover 42 also has a recession opening 48 either. An engaging aperture 423 is provided at both lateral walls 422 of the upper cover 42 respectively such that the respective projecting piece 413 may engage with the respective engaging aperture 423 firmly and extends outward while the upper cover 42 is joined to the base 41. The sensor switch 45 on the upper cover 42 comprises a first spring strip 451 and a second spring strip 452 and both the spring strips contact with each other at an end thereof. The first spring strip 451 has projection part 453 extends outward from a lateral side of the projection section 421 on the upper cover 421. When the multimedia card is inserted into the projection section 421 to press against the projection part 453 on the first spring strip 451, the projection part 453 may move inward to make the first spring strip 451 disconnect the second spring strip 452. Each contact piece on the multimedia card contacts with a long connecting pin 46.

Figure 4:
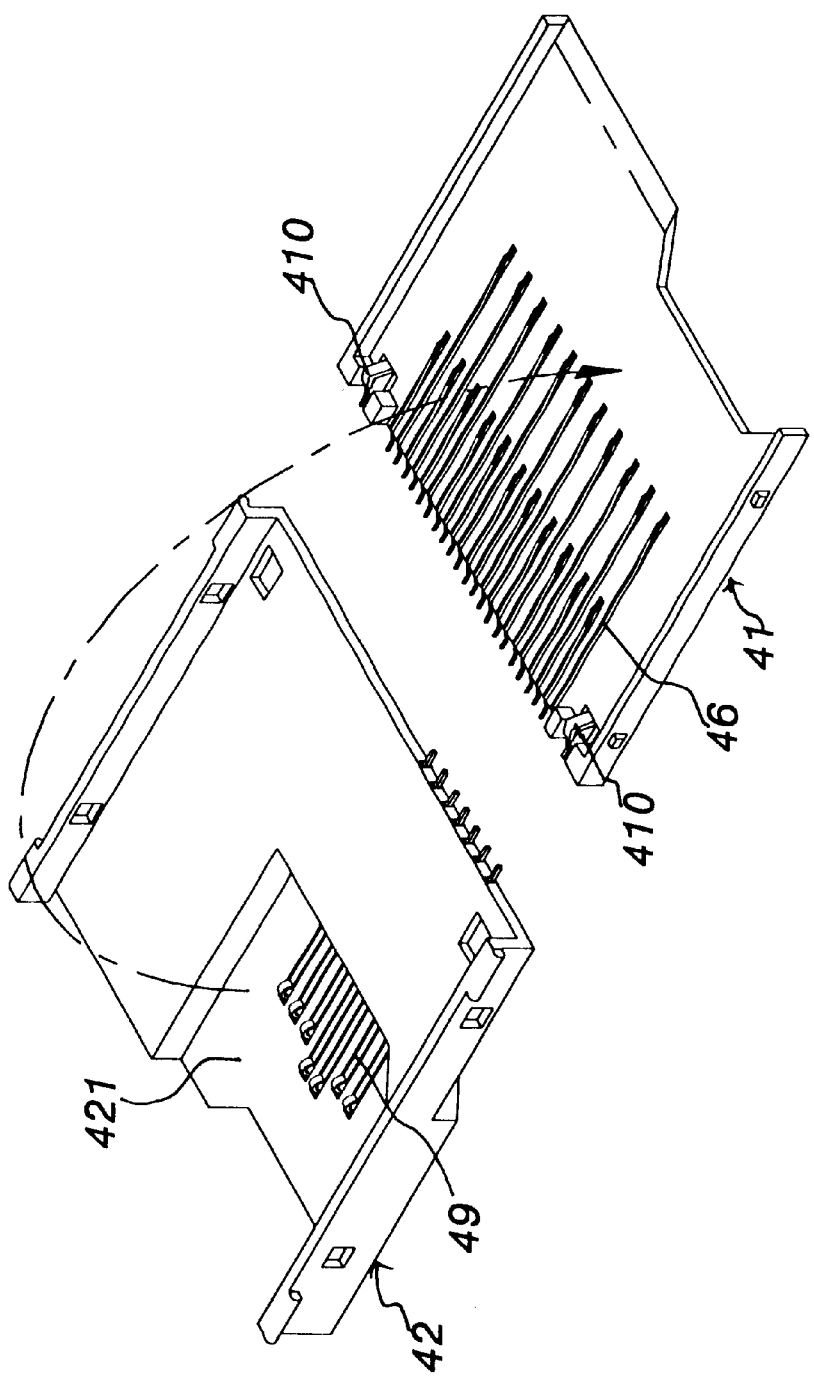
FIG. 4 is a disassembled perspective view similar to FIG. 3 illustrating a base and a cover in a second embodiment of the present invention.

Referring to FIG. 4, a second embodiment of the present invention provides connecting pins 49 in the projection section 421 on the upper cover 42 and these connecting pins 49 at an end thereof pressingly contact with contact pieces on the multimedia card. The other ends of these connecting pins 49 extend outward from the top of the upper to connect with the circuit on a circuit board. Contact pieces on the multimedia card do not contact with long connecting pins 46 at the base 41 in the second embodiment. A sensor switch 410 is provided at both lateral sides of the base 41 respectively only in the second embodiment.

Figure 5:
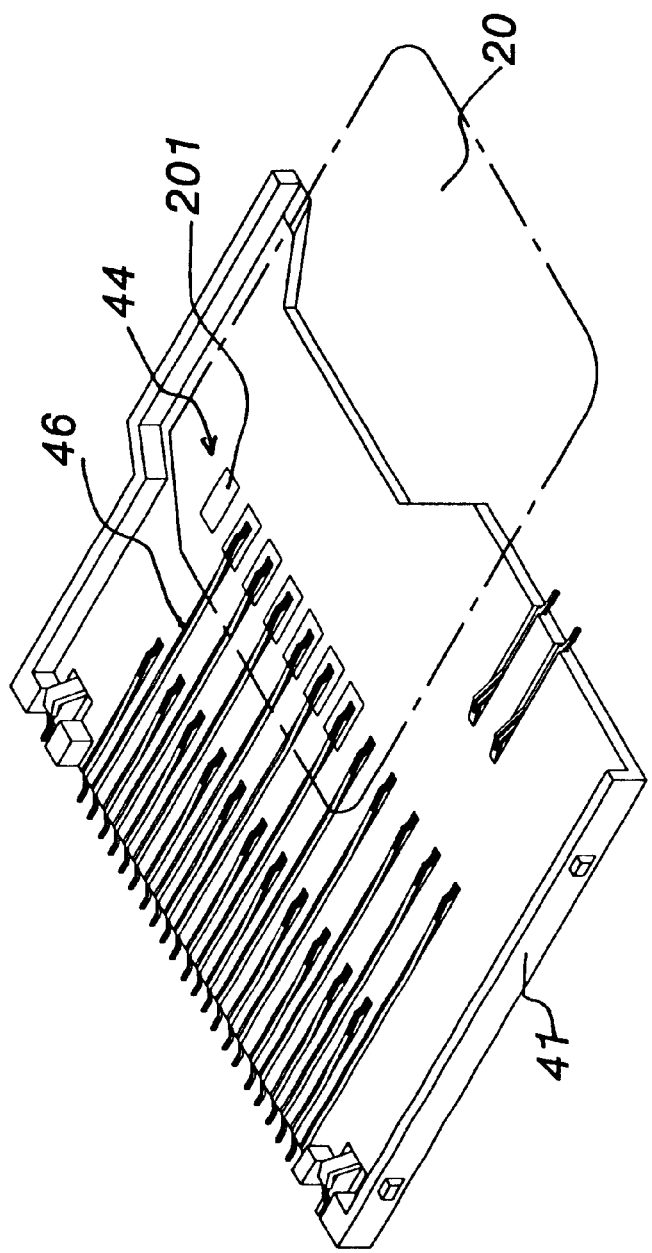
FIG. 5 is perspective view of a base in a third embodiment of the present invention.

Referring to FIG. 5, a third embodiment of the present invention provides an expanded second receiving slot toward a lateral side of the base 41. In this way, a second contact piece next to the first contact piece 201 on the multimedia card can contact with a long connecting pin 46 close to this lateral side to leave the first contact piece 201 not being contacted. The contact piece 201 is a reserved one and it can be kept not in use.

Figure 6:
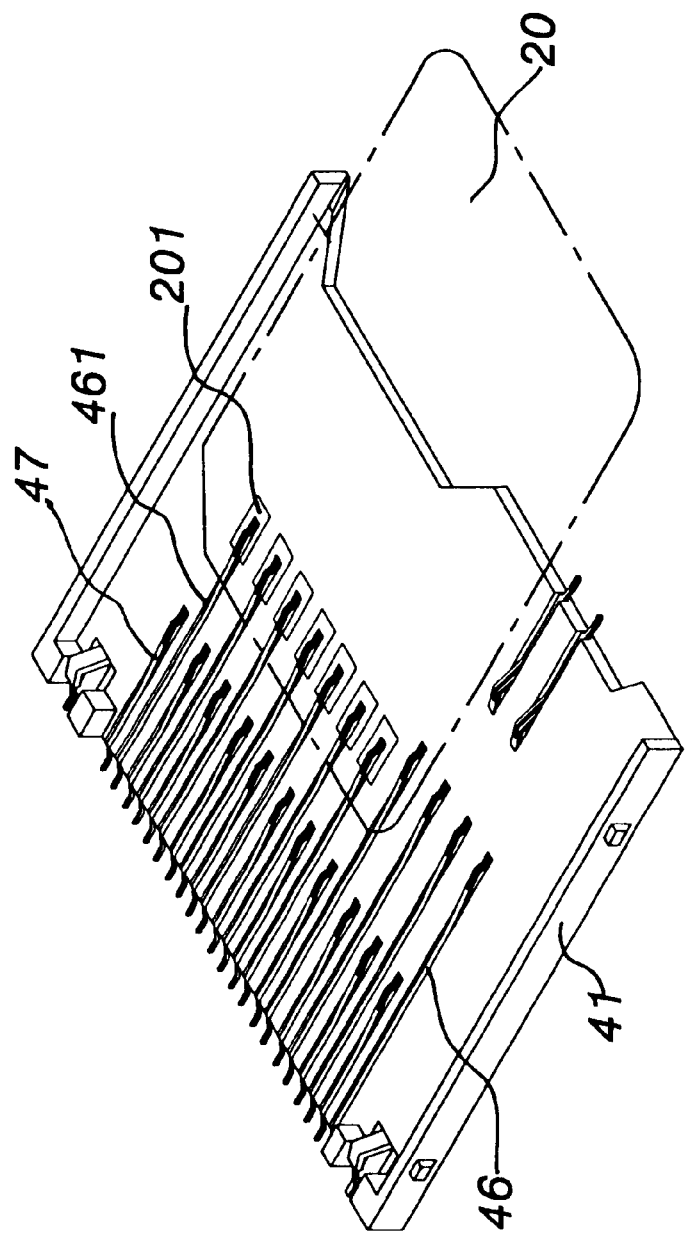
FIG. 6 is a perspective view of a base in a fourth embodiment of the present invention.
Figure 7:
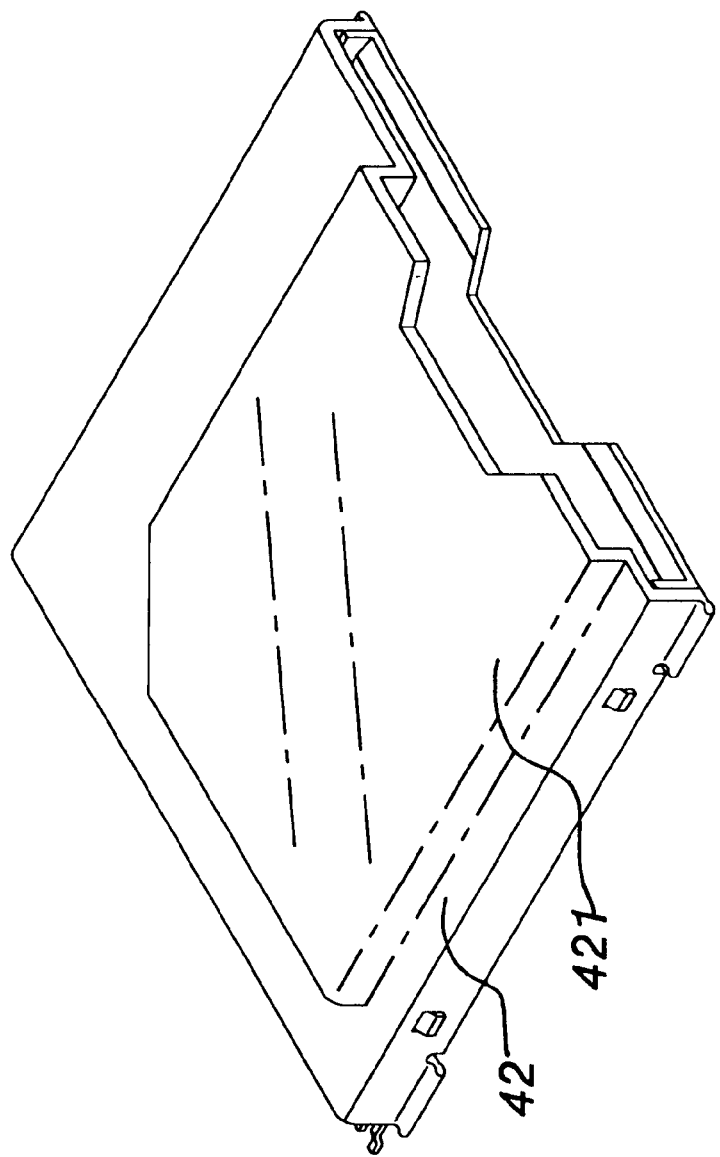
FIG. 7 is a perspective view of outer look of a fifth embodiment according to the present invention.
Figure 8:
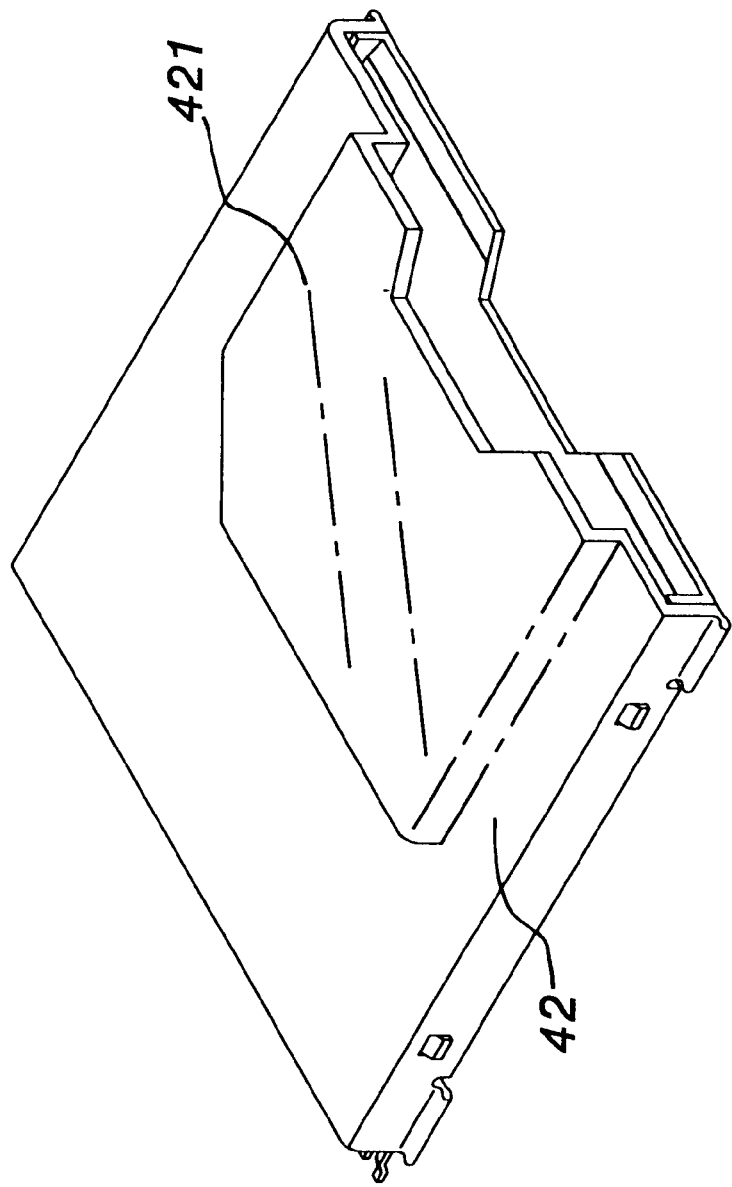
FIG. 8 is a perspective view of outer look of a sixth embodiment according to the present invention.

Referring to FIG. 6, a fourth embodiment of the present invention provides seven of long connecting pins on the base 41 and these seven connecting pins are a little shorter than rest of long connecting pins about 0.3–0.4 mm. In this way, the multimedia card and the secure digital memory card have their rear parts extend outward from the rear end of the common socket device a length equal to each other. These seven shortened long connecting pins may contact with contact pieces on the smart media card and the multimedia card respectively. Referring to FIG. 7, the projection section 421 on the upper cover 42 may extend backward to have the second receiving slot extends to the rear part of the common socket device. In this way, the contact pieces on the multimedia card may be pressingly contacted by short connecting pins on the base. Referring to FIG. 8, the projection section 421 may be arranged at the middle area of the upper cover 42.

Figure 9:
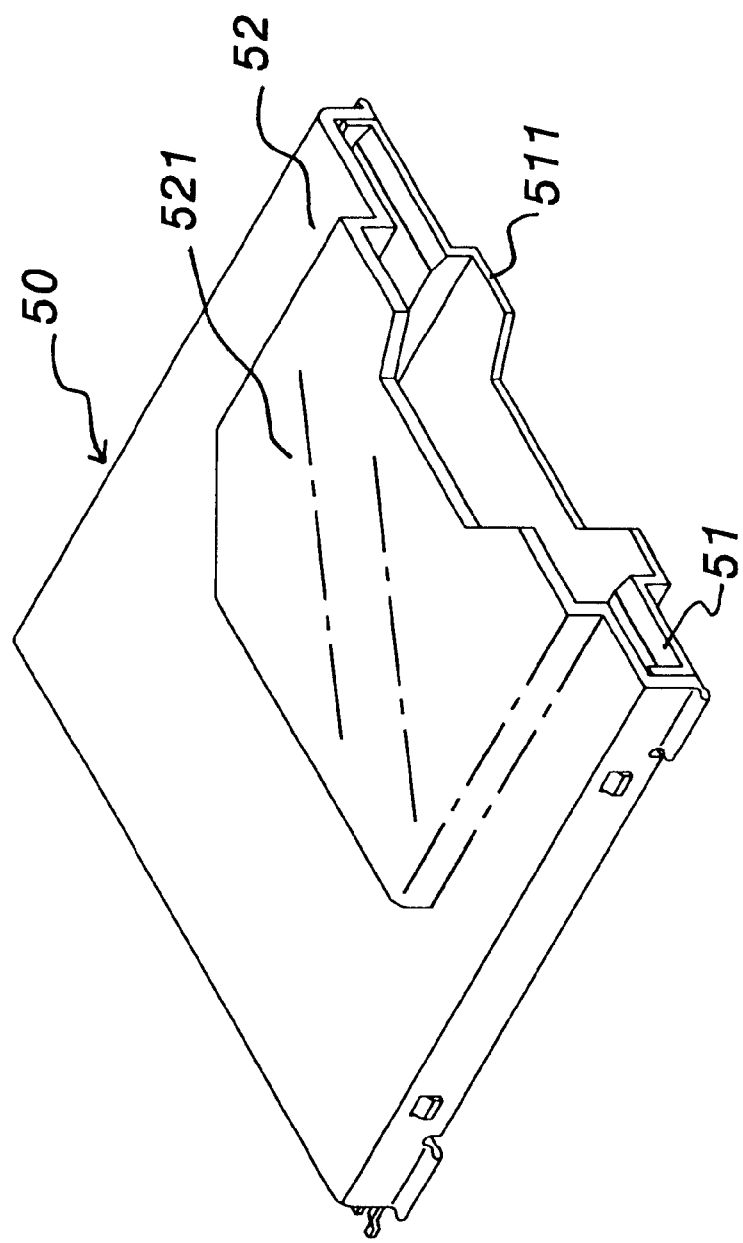
FIG. 9 is a perspective view of outer look of a seventh embodiment according to the present invention.
Figure 10:
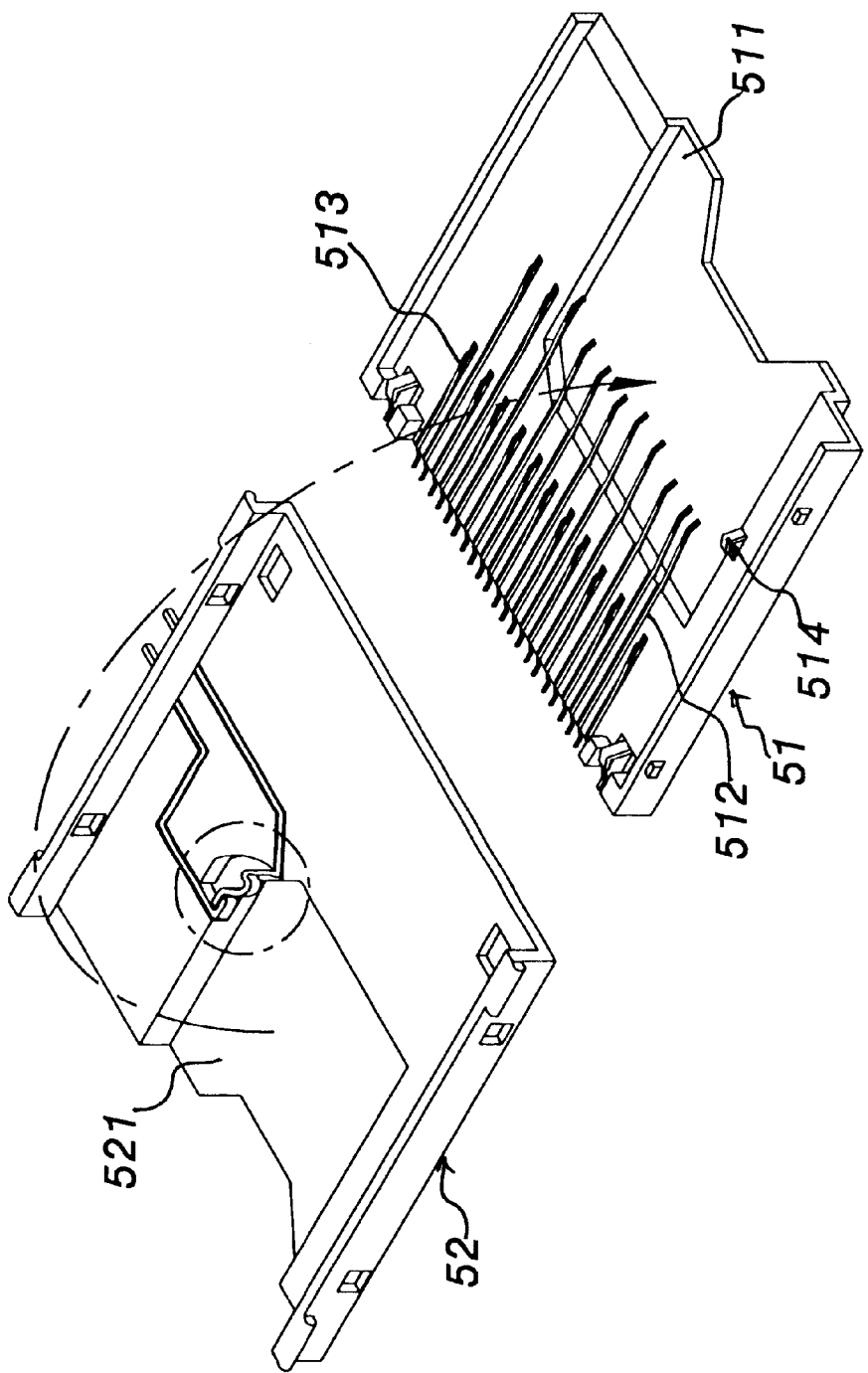
FIG. 10 is a disassembled perspective view of the common socket device for memory cards shown in FIG. 9 illustrating a base and a cover thereof.

Referring to FIGS. 9 and 10, a seventh embodiment of the present invention is a common socket device 50 for three cards. The common socket device 50 has a primary difference from the common socket device 40 for two cards shown in FIGS. 2 and 3. The difference is that the base 51 thereof is provided with a lower recession part 511 to match with the projection section 421 on the upper cover 52 so as to form a space for receiving the secure digital memory card. In order to adapt with two contact pieces closer to each other near lateral sides of the secure digital memory card respectively, long connecting pins 512 and short connecting pins 513 on the base 51 are rearranged. Therefore, these two contact pieces near lateral sides of the secure digital memory card are contacted by long connecting pins 512. In addition, a sensor switch 514 is provided on the base 51 to detect if the write protection switch in the secure digital memory card is in a state of on. The sensor switch 514 may extend outward from a lateral side of the lower recession part 511. Because the lower recession part 511 has a width smaller than the projection section 521, the multimedia card may be placed in a space formed by the projection section 521 without falling in the lower recession 511.

Figure 11:
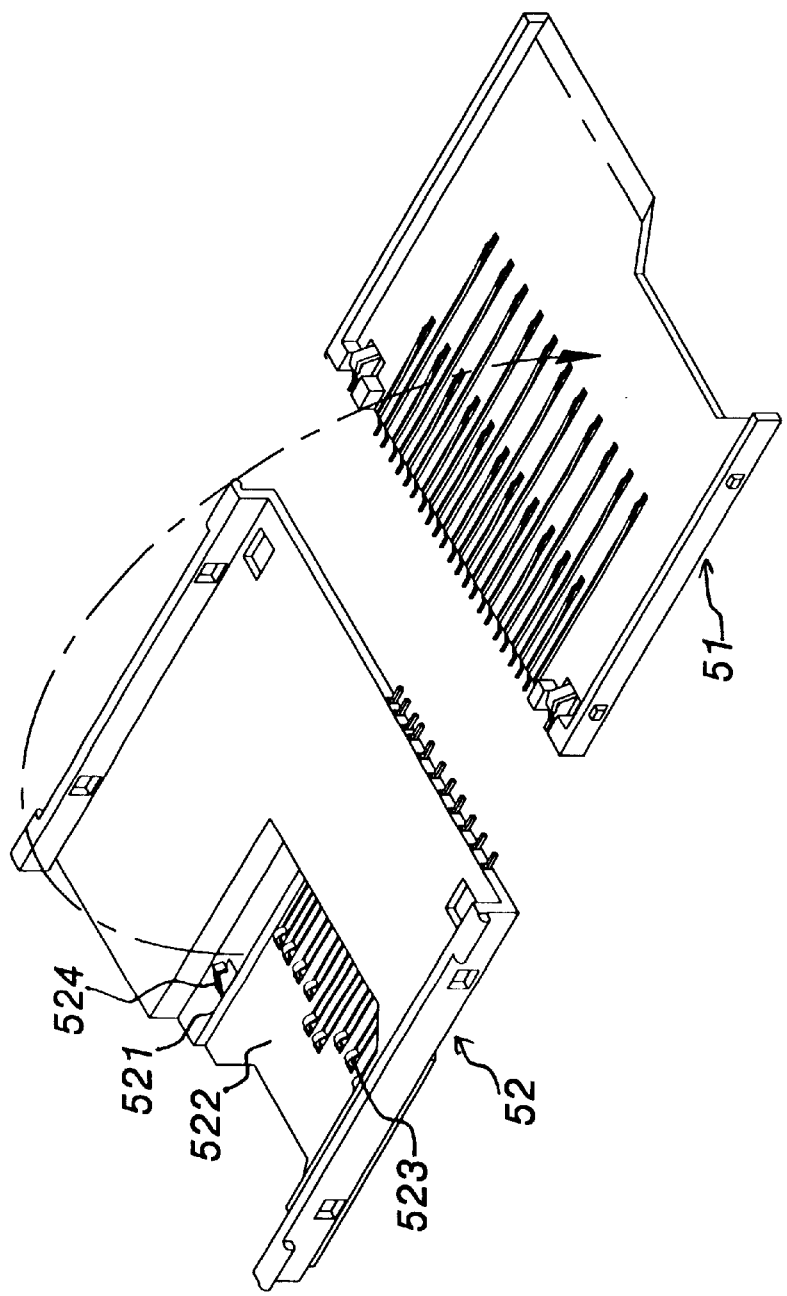
FIG. 11 is a disassembled perspective view similar to FIG. 10 illustrating a base and a cover in a eighth embodiment of the present invention.

Referring to FIG. 11, an eighth embodiment of the present invention provides a common socket device for three cards different from the second embodiment shown in FIG. 2. The difference is that a swollen part 522 is formed on the projection section 521 of upper cover 52 for receiving the secure digital memory card, and two more connecting pins 523 are added. In addition, a sensor switch 524 is provided to detect the write protection switch. The sensor switch 524 may extend outward from a lateral side of the projection section 521.

Figure 12:
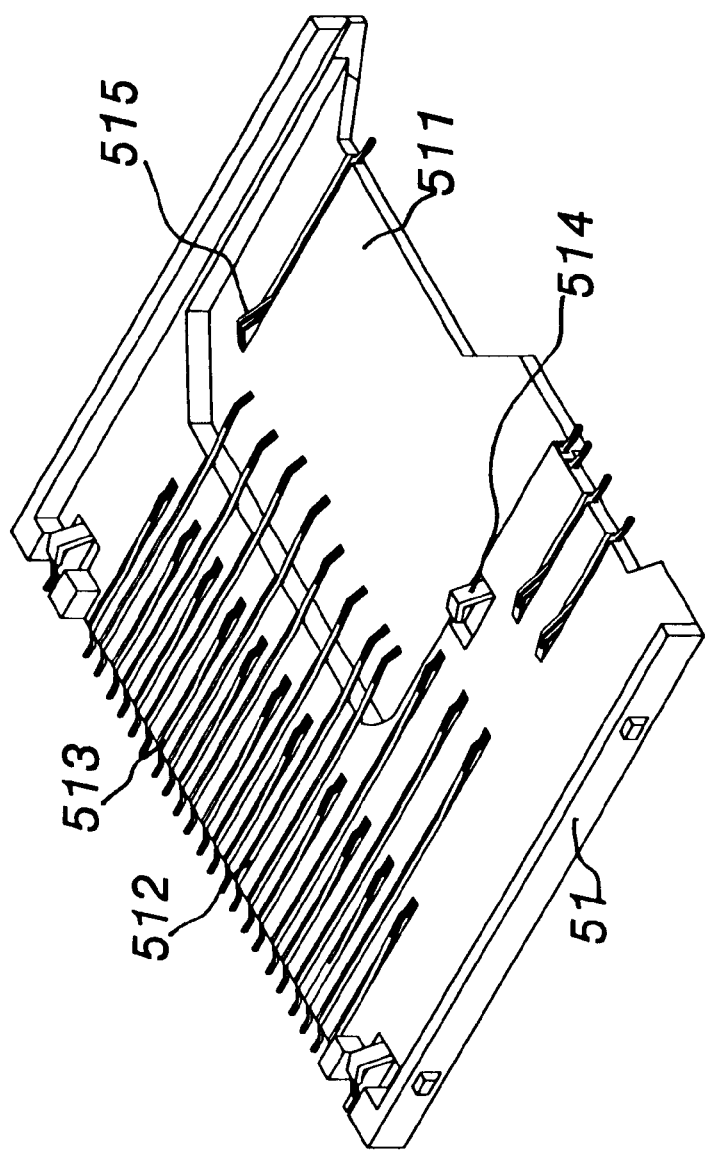
FIG. 12 is a perspective view of a base in a ninth embodiment of the present invention.

Referring to FIG. 12, a ninth embodiment of the present invention provides a common socket device for three cards, which is different from the fourth embodiment shown in FIG. 6. The difference is that a lower recession part 511 is arranged on the base 51 for receiving the secure digital memory card and two contact pieces closer to each other at lateral sides of the secure digital memory card match with long connecting pins 512. In addition, a sensor switch 514 for detecting the write protection switch and a reversed connecting pin 515 are provided in the ninth embodiment.

Figure 13:
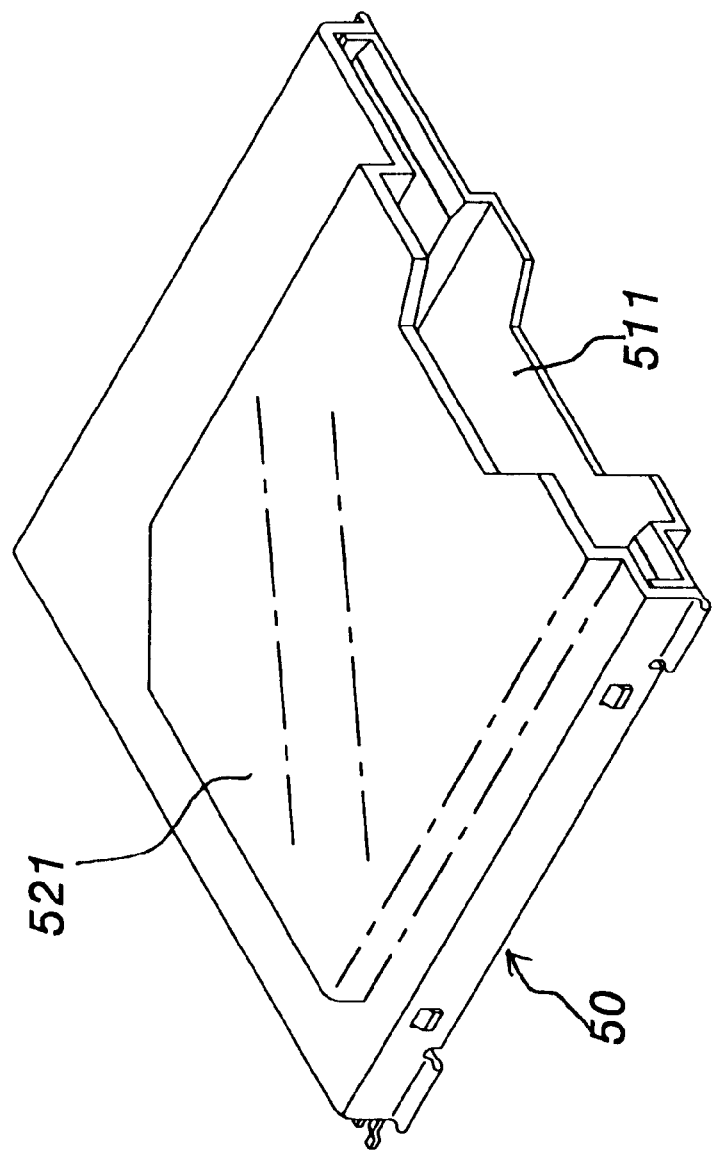
FIG. 13 is a perspective view of outer look of a tenth embodiment according to the present invention.

Referring to FIG. 13, a tenth embodiment of the present invention provides a common socket device 50 for three cards. Contact pieces on the multimedia card and the secure digital memory card can contact with short connecting pins in the common socket device 50 because a longer lower recession 511 and a longer projection section 521 are arranged on the common socket device 50. It is noted that connecting pins in the area possibly reached by the secure digital memory card have to be movable vertically and extendable longitudinally so as not to bias the secure digital memory card being inserted into the common socket device 50 of the present embodiment.

Figure 14:
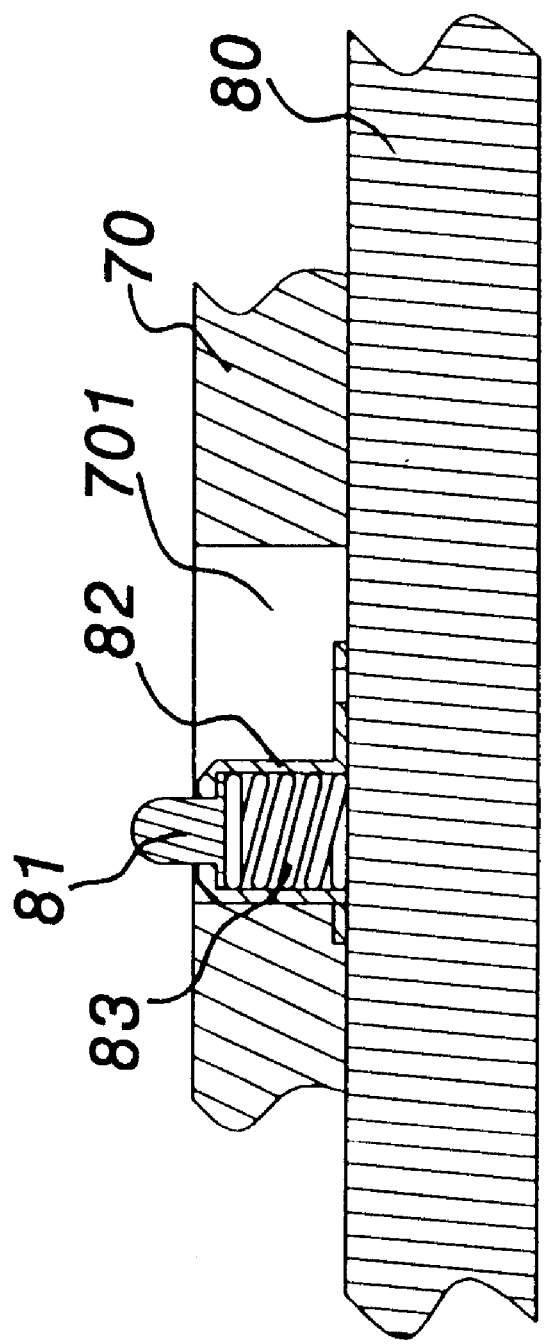
FIG. 14 is a sectional view of a spring leg used in the present invention.

It is necessary to arrange a conductive part such as connecting pins disclosed in preceding described embodiments to match the location of contact pieces on the memory card. Referring to FIG. 14, another embodiment of conductive part is illustrated. A hole 701 is set up in the base 70 corresponding to the position of contact pieces on the smart media card, the multimedia card, and the secure digital memory card respectively. The circuit board 80 is provided with a extendable connecting head 81 corresponding to the hole 701. The extendable connecting head 81 may touch contact pieces on the smart media card, the multimedia card, and the secure digital memory card such that the circuit on circuit board 80 may connect with these memory cards respectively. The extendable connecting head 81 is received in a fixing seat 82 attached to the circuit board 80 and pressed outward by a spring 83 in the fixing seat 82. The extendable connecting head 81 may move backward in the fixing seat 82 against the biasing force of the spring.

Figure 15:
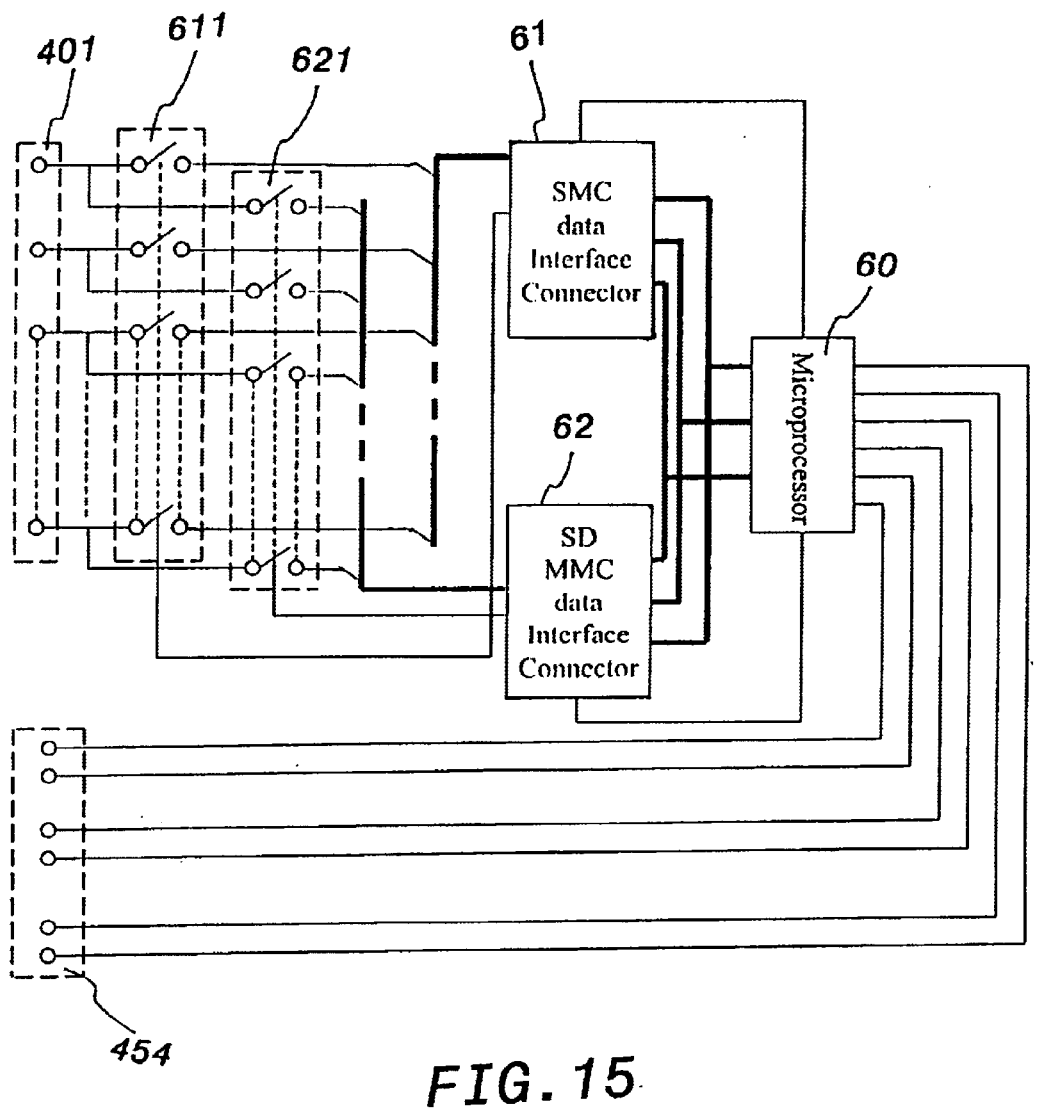
FIG. 15 is a circuit diagram illustrating a circuit arranged in the present invention.

Referring to FIG. 15, the structure of circuit adapted with the common socket device of the present invention is illustrated. The circuit comprises a microprocessor 60 connecting joining points 454 on three sensor switches, an interface connector 61 for data of the smart media card, an interface connector 62 for data of multimedia card/secure digital memory card. The interface connector 61 and the interface connector 62 connect a switch 611, 621 respectively. These two switches 611, 621 connect with each other at the other end thereof and then connect with a joining point on the common socket device so as to connect with long connecting pins and short connecting pins respectively. Once the smart media card, the multimedia card, and the secure digital memory card are inserted into the common socket device, the microprocessor 60 may sense reaction signals from these three sensor switches. Then, the microprocessor 60 may determine to control the switch 611 via the interface connector 61 or the switch 621 via the interface connector 62. Therefore, connect connecting pins in the common socket device may connect with the smart media card, the multimedia card, and the secure digital memory card.

Figure 16:
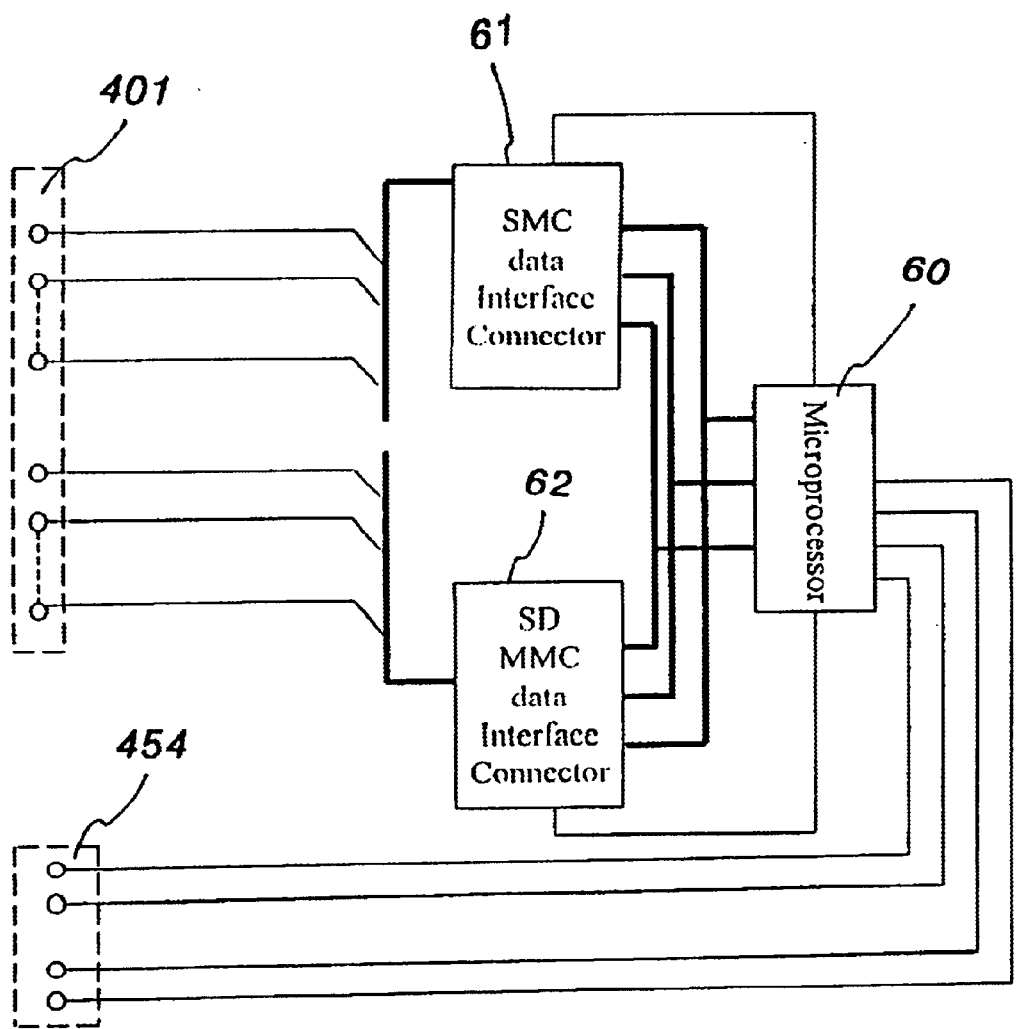
FIG. 16 is another circuit diagram illustrating another circuit arranged in the present invention.

Referring to FIG. 16, another embodiment for the structure of circuit is illustrated. The circuit comprises a microprocessor 60, an interface connector 61 for data of smart media card, an interface connector 62 for data of multimedia card/secure digital memory card, and joining points 454 for sensor switches on the base. The interface connectors 61, 62 connect with the joining point 401 of the common socket device respectively so as to connect with connecting pins on the base and the upper cover. Once the smart media card is inserted into the common socket device, the microprocessor 60 may sense the reaction signals of these sensor switches to identify the smart media card or read directly if it is necessary to insert the multimedia card/secure digital memory card. Then, the microprocessor 60 further determines to read and write data in the smart media card via the interface connector 61 or data in the multimedia card/secure digital memory card via the interface connector 62.

It can be understood that it is required 37 contact points totally while an independent socket device is used for the smart media card, the multimedia card, and the secure digital memory card respectively. It is appreciated that the common socket device for the smart media card, the multimedia card, and the secure digital memory card according to the present invention can reduce to 27 contact points at most to achieve a purpose of saving contact points. Furthermore, the present invention provides a common receiving space for the smart media card, the multimedia card, and the secure digital memory card to save the gross volume required by these three socket devices corresponding to the smart media card, the multimedia card, and the secure digital memory card. Accordingly, it is convenient for a usr and economical for saving the production cost of two extra socket device due to the common socket device of the present invention being adaptable for connecting the smart media card, the multimedia card, or the secure digital memory card respectively.

While the invention has been described with reference to a preferred embodiment thereof, it is to be understood that modifications or variations may be easily made without departing from the spirit of this invention, which is defined by the appended claims.

What is claimed is:

1. A common socket device for memory cards, comprising:

base with a rear side;

an upper cover with a rear side, being joined to the base, and being provided with a projection section; and a conductive part, being provided on the base and/or inside the upper cover respectively for matching with contact pieces on the respective memory card;

wherein, a first receiving slot and a second receiving slot are formed in the common socket device and a common section is between said two receiving slots respectively and wherein said base has a lower recession part to make interior of the common socket device form a third receiving slot to share the common section for the first and the second receiving slots.

2. The common socket device for memory cards according to claim 1, wherein said base is provided with sensor switches.

3. The common socket device for memory cards according to claim 2, wherein said sensor switches comprises a sensor switch to detect a read and write protective switch on said memory cards.

4. The common socket device for memory cards according to claim 2, further comprising:

a microprocessor, connecting joining points of each sensor switch on the common socket device;

a first interface connector for data of a smart media card;

a second interface connector for data of a multimedia card/secure digital memory card;

a first switch with two ends, an end of said two ends connecting with said interface connector on the smart media card;

a second switch with two ends, one of said two ends connecting with said interface connector on the multimedia card/secure digital memory card; and a conductive part at a base on the common socket device, connecting the other end of said first switch and the other end of said second switch respectively;

whereby, the microprocessor may sense reaction signal from said sensor switch to determine a control of first switch via the first connector or a control of second switch via the second connector while the smart media card is inserted into the common socket device such that the conductive part can be connected so as to connect the smart media card or multimedia card/secure digital card.

5. The common socket device for memory cards according to claim 1, wherein said conductive part is a plurality of connecting pins.

6. The common socket device for memory cards according to claim 5, wherein said plurality of connecting pins further comprises two long connecting pins, being arranged to be adjacent to each other; and long connecting pins other than said two adjacent ones and short connecting pins, being arranged to have one of said long connecting pins adjacent to one of said short connecting pins alternately;

wherein, each of said plurality of connecting has an end thereof extending outward from a front side of the base and the other end thereof being elastically bent upward.

7. The common socket device for memory cards according to claim 1, wherein said upper cover is provided with sensor switches.

8. The common socket device for memory cards according to claim 7, wherein said sensor switches comprises a sensor switch to detect a read and write protective switch on said memory cards.

9. The common socket device for memory cards according to claim 7, wherein one of said sensor switches further comprises a first spring strip with an end, having a swollen part extending outward a lateral side of the projection section; and a second spring strip with an end either, said end contacting with the end on said first spring strip.

10. The common socket device for memory cards according to claim 1, wherein an internal side of the projection section on the upper cover further comprises a plurality of connecting pins being arranged in a way of equally spacing to one another with an end thereof extending outward from the front side of the upper cover and the other end thereof being elastically bent upward.

11. The common socket device for memory cards according to claim 10, further comprising:

a microprocessor, connecting joining points of each sensor switch on the common socket device;

a first interface connector for data of a smart media card;

a second interface connector for data of a multimedia card/secure digital memory card;

a conductive part at a base on the common socket device, connecting with said first switch and said second switch respectively; and a plurality of connecting pins at an upper cover of the common socket device, connecting said two connectors either;

whereby, once a smart media card or a multimedia card/secure digital memory card is inserted into the common socket device, the microprocessor may sense reaction signals from the respective sensor switch to identify the smart media card or to read directly if the multimedia card/secure digital card is inserted and then determine a data reading and writing in the smart media card via the first connector or in the multimedia card/secure digital memory card via the second connector.

12. The common socket device for memory cards according to claim 1, wherein said second and third receiving slots extend to the rear section of the common socket device.

13. The common socket device for memory cards according to claim 1, wherein said conductive part has a plurality of openings for extendable connecting pins passing through and contacting with contact pieces on said memory cards.

14. A common socket device for a plurality of different memory cards, comprising:

a base with a rear side;

an upper cover with a rear side joined to the base the upper cover including a projection section; and a conductive part provided inside one of the base and the upper cover located to match with contact pieces on a plurality of different memory cards;

a microprocessor, connecting joining points of each sensor switch on the common socket device;

a first interface connector for data of a smart media card;

a second interface connector for data of a multimedia card/secure digital memory card;

a first switch with two ends, an end of said two ends connecting with said interface connector on the smart media card;

a second switch with two ends, one of said two ends connecting with said interface connector on the multimedia card/secure digital memory card; and a conductive part at a base on the common socket device, connecting the other end of said first switch and the other end of said second switch respectively;

wherein the base and upper cover form a single receiving slot having at least first and second receiving slot portions with a common section between said at least first and second receiving slot portions so as to accommodate a plurality of different memory cards therein; and wherein said upper cover is provided with sensor switches;

whereby, the microprocessor may sense reaction signal from said sensor switch to determine a control of first switch via the first connector or a control of second switch via the second connector while the smart media card or a multimedia card/secure digital memory card is inserted into the common socket device such that the conductive part can be connected so as to connect the smart media card or multimedia card/secure digital card.

15. A common socket device for a plurality of different memory cards, comprising:

a base with a rear side;

an upper cover with a rear side joined to the base, the upper cover including a projection section; and a conductive part provided inside one of the base and the upper cover located to match with contact pieces on a plurality of different memory cards;

a microprocessor, connecting joining points of each sensor switch on the common socket device;

a first interface connector for data of a smart media card;

a second interface connector for data of a multimedia card/secure digital memory card;

a conductive part at a base on the common socket device, connecting with said first switch and said second switch respectively; and a plurality of connecting pins at an upper cover of the common socket device, connecting said two connectors either;

wherein the base and upper cover form a single receiving slot having at least first and second receiving slot portions with a common section between said at least first and second receiving slot portions so as to accommodate a plurality of different memory cards therein; and wherein said projection section on the upper cover at an internal side thereof further comprises a plurality of connecting pins with first ends thereof extending out of the rear side of the upper cover and second ends thereof elastically bent upward;

whereby, once a smart media card or a multimedia card/secure digital memory card is inserted into the common socket device, the microprocessor may sense reaction signals from the respective sensor switch to identify the smart media card or to read directly if the multimedia card/secure digital card is inserted and then determine a data reading and writing in the smart media card via the first connector or in the multimedia card/secure digital memory card via the second connector.

* * * * *

UNITED STATES PATENT AND TRADEMARK OFFICE
CERTIFICATE OF CORRECTION

| | |
|---|---|
| PATENT NO. | : 6,663,007 B1 |
| APPLICATION NO. | : 09/709452 |
| DATED | : December 16, 2003 |
| INVENTOR(S) | : Sun et al. |

It is certified that error appears in the above-identified patent and that said Letters Patent is hereby corrected as shown below:

On the Title Page,

Item (73) should read,

"KINPO ELECTRONICS, INC."

Signed and Sealed this
Fourth Day of September, 2012

David J. Kappos
*Director of the United States Patent and Trademark Office*